March 26, 1929. H. V. TÖRNEBOHM 1,706,595
MEANS FOR TRANSFORMING CONTINUOUS ROTARY
MOTION INTO OSCILLATORY MOTION
Filed Feb. 3, 1926
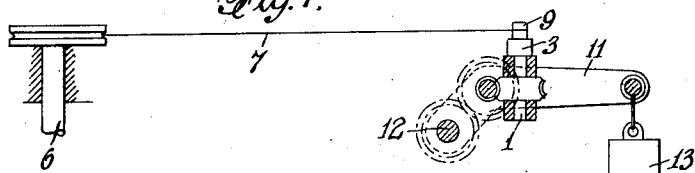
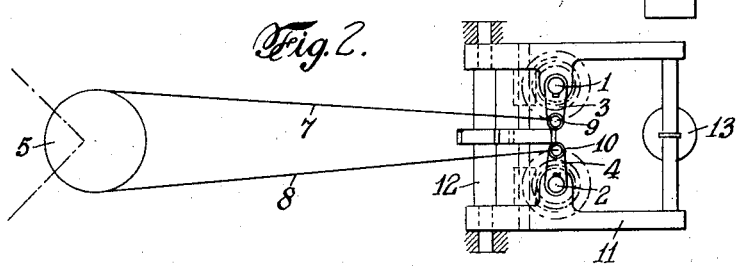
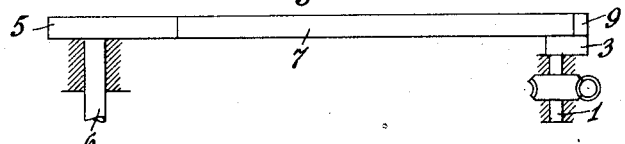
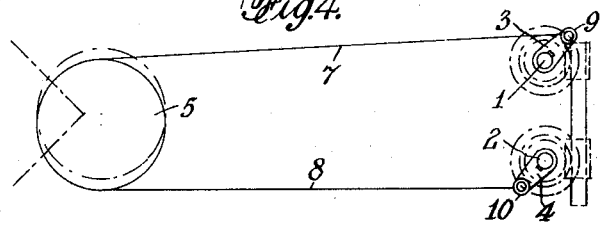
INVENTOR
Hilding Valdemar Tornebohm
BY
his ATTORNEY Patented Mar. 26, 1929.

1,706,595

UNITED STATES PATENT OFFICE.

HILDING VALDEMAR TÖRNEBOHM, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

MEANS FOR TRANSFORMING CONTINUOUS ROTARY MOTION INTO OSCILLATORY MOTION.

Application filed February 3, 1926, Serial No. 85,610, and in Sweden February 9, 1925.

This invention relates to improvements in means for transforming continuous rotary motion into oscillatory motion.

A large group of working machines comprises members having an oscillatory motion. Examples of such machines are sphere and race grinding machines in which either the blank or the grinding wheel describes not only the usual rotary motion but also an oscillatory motion about a fixed centre, so that the point of contact between the blank and the grinding wheel will move along a circular arc whose centre coincides with the centre of oscillation of the oscillatory member.

The mechanism for producing the oscillatory motion usually consists of a connecting-rod mechanism, or a reversing mechanism, respectively. In the former case, a crank is attached to the rotary shaft, the said crank transmitting motion through a connecting-rod to a larger crank connected to the shaft to be oscillated, whereas, in using the reversing mechanism, a bevel gear attached to the rotary shaft engages, at diametrically opposite points, two bevel gears carried by the driven shaft, or by an intermediate shaft geared to the driven shaft, the latter gears being alternately locked to their shaft, for instance through abutments and levers, whereby the said latter shaft and, thereby, the driven member is made to oscillate.

The devices indicated, as well as all devices hitherto used for the purpose considered have certain drawbacks, inasmuch as the oscillatory member is subjected to forces greatly varying in magnitude and direction. Thus, in the connecting-rod mechanism, the connecting-rod is subjected to varying tensile and compression stresses, causing very varying forces acting in different directions on the bearings supporting the oscillatory member. It is obvious that the reversing mechanism will also cause great variations in the directions of the bearing pressures.

The variations in magnitude and directions of the bearing loads here contemplated obviously disturb the motion of the oscillating masses, a smooth running free from vibrations being indispensable if the finished product is to fulfill strict stipulations in respect of precision. A device in which this variation of forces is entirely or substantially eliminated will, therefore, imply a considerable improvement.

The object of this invention is to afford such improvements. The invention is based on the principle of using two co-operating members or groups of members for transmitting motion from the driving member to the driven member, each of the said two co-operating members or groups of members serving to transmit motion in one direction only, thus ensuring that the oscillatory member is not subjected to forces of greatly varying directions emanating from the driving device. The driving member suitably consists of two cranks, crank disks, or the like, rotating with the same angular speed in the same direction, or in opposite directions, respectively. The invention consists, chiefly, in the connections between the driving member and the driven member being attached to an eccentric or a curved disk connected to the driven member and being so formed that the distance between the driving member and the driven member remains constant or approximately constant, while the length of the connecting members remains constant. The driving member may also be carried by a frame adapted to turn or move in relation to the driven member, the said frame being actuated by a weight, spring, or the like, in order to regulate the stresses in the connecting members.

In the drawing, Fig. 1 is a side view, and Fig. 2 is a plan view of a device illustrating diagrammatically the principle of the invention. Figs. 3 and 4 show in a similar manner a particular form of embodiment of the invention.

Referring to the drawing, the driving power is transmitted through a worm gear device to two shafts 1, 2 having cranks 3, 4 mounted in opposite directions, the said shafts being thus driven synchronously in the same direction. The shafts may as well be driven in opposite directions if the cranks are mounted in the same direction. The oscillatory member 5 is carried by a shaft 6 and connected through bands 7, 8, such as steel bands, to the cranks 9, 10. Instead of bands, other connecting members may be used, such as leather straps, strings, wires, connecting rods, racks, or the like.

In the diagram shown in Figs. 1 and 2, the part of the oscillatory member taking up the movement consists of a circular disk. Instead of such a disk, an angle lever, a yoke or the like may as well be used. By the rotation of the cranks 3, 4, the disk 5 is caused to oscillate. The oscillating motion being effected through tensile stresses only in the connecting members, the bearing loads on the shaft 6 will always have substantially the same direction.

The lengths of the bands 7, 8 will be slightly changed during working, but the changes in lengths may be held within the limit of elasticity if the distance between the cranks 3, 4 and the oscillatory member 5 be sufficiently great. It is, however, obvious, that the necessary changes in lengths will entail varying stresses in the connecting members which, in turn, will cause variations in the magnitude of the bearing loads.

The present invention provides means for removing this drawback, and compensating for the tightening and loosening of the bands caused by the crank action. According to Figs. 1 and 2, in which the oscillatory member consists of a circular disk 5, shown mounted eccentrically on the shaft 6, and the connecting members of wires 7, 8, the worm gear device is carried by a frame 11 swingably mounted on the driving shaft 12 and loaded by a weight 13, spring or the like. It is obvious that the frame can equally well be adapted to slide longitudinally, if desired.

In the form of embodiment of the invention shown in Figs. 3 and 4, the elimination of stress variations has been effected by placing the oscillatory member 5 eccentrically on the shaft 6, for compensating for the crank action. The same result may, obviously, be gained by suitably curve-shaping the member 5.

It is obvious that the means hereinbefore described may be combined, if desired.

Having now described my invention, what I claim is:

1. Means for transforming continuous rotary motion into oscillatory motion comprising a pair of adjacent driving cranks, means for rotating said cranks in the same directions, flexible elements driven by said cranks, and a driven shaft provided with a disc of variable contour around opposite sides of which said elements pass, the contour of said disc being such as to maintain said flexible elements taut for all positions of said cranks.

2. A device according to claim 1 characterized by the driving means being carried by a frame movable toward and from the driven member and having means constantly urging the frame away from the driven member.

3. Means for transforming continuous rotary motion into oscillatory motion comprising a pair of driving cranks having adjacent parallel axes and moving in the same direction, flexible elements each having one end fixed to a respective crank at the free end thereof, an oscillatory shaft spaced from the axes of the cranks, and a compensating disc fixed on the oscillating shaft and having the remaining ends of said flexible elements connected to opposite sides of the periphery of the disc, and engaging around a portion of the periphery the contour of the disc being such as to maintain constant tension on said flexible elements in all positions of said cranks.

4. A device according to claim 3 characterized by the driving means being carried by a frame movable toward and from the driven member and having means constantly urging the frame away from the driven member.

In testimony whereof I have signed my name.

HILDING VALDEMAR TÖRNEBOHM.